United States Patent
Moss et al.

(10) Patent No.: US 10,783,520 B2
(45) Date of Patent: Sep. 22, 2020

(54) FRAUD DETECTION

(71) Applicants: Beth Moss, Danville, CA (US); Angela Berkery, Sandy, UT (US); Michael J. Johnson, Lake Oswego, OR (US); Benjamin W. Geertz, Milwaukie, OR (US)

(72) Inventors: Beth Moss, Danville, CA (US); Angela Berkery, Sandy, UT (US); Michael J. Johnson, Lake Oswego, OR (US); Benjamin W. Geertz, Milwaukie, OR (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 250 days.

(21) Appl. No.: 14/322,499

(22) Filed: Jul. 2, 2014

(65) Prior Publication Data
US 2016/0005044 A1    Jan. 7, 2016

(51) Int. Cl.
*G06Q 20/40* (2012.01)

(52) U.S. Cl.
CPC .............................. *G06Q 20/4016* (2013.01)

(58) Field of Classification Search
None
See application file for complete search history.

(56) References Cited

U.S. PATENT DOCUMENTS

| | | |
|---|---|---|
| 7,272,728 B2 | 9/2007 | Pierson et al. |
| 8,041,620 B2 | 10/2011 | Collins et al. |
| 8,272,033 B2 | 9/2012 | Wasmund |
| 8,280,833 B2 * | 10/2012 | Miltonberger ....... G06Q 10/067 706/45 |
| 8,340,259 B2 | 12/2012 | Mahone et al. |
| 8,346,691 B1 | 1/2013 | Subramanian et al. |
| 8,527,385 B2 | 9/2013 | Clarke et al. |
| 8,589,298 B2 | 11/2013 | Choudhuri et al. |
| 8,626,663 B2 | 1/2014 | Nightengale et al. |
| 9,292,677 B2 * | 3/2016 | Ranganathan .......... G06F 21/33 |
| 2005/0097320 A1 * | 5/2005 | Golan ..................... G06F 21/40 713/166 |
| 2007/0106582 A1 * | 5/2007 | Baker .................... G06Q 40/08 705/35 |

(Continued)

FOREIGN PATENT DOCUMENTS

KR          10-1153968 B1 *  6/2012  ............. G06Q 40/02

OTHER PUBLICATIONS

"Enterprise Fraud Management with ACI Proactive Risk Manager on IBM System z" dated Sep. 16, 2009 by Alex Louwe Kooijmans. (Year: 2009).*

(Continued)

*Primary Examiner* — Alexander G Kalinowski
*Assistant Examiner* — Blane A Lickteig
(74) *Attorney, Agent, or Firm* — Walter Haverfield LLP; James J. Pingor (57) ABSTRACT

Systems and methods of fraud prevention are discussed. One such method can include the acts of monitoring one or more events associated with at least one account at a financial institution; analyzing characteristics associated with a first event of the one or more events; determining whether to designate the first event as risky; and implementing one or more measures in response to the designation of the first event as risky.

20 Claims, 6 Drawing Sheets

(56) References Cited

U.S. PATENT DOCUMENTS

| | | |
|---|---|---|
| 2008/0104684 A1 | 5/2008 | Lunde et al. |
| 2012/0226579 A1 | 9/2012 | Ha et al. |
| 2013/0024373 A1* | 1/2013 | Choudhuri ........... G06Q 30/018 |
| | | 705/42 |
| 2013/0110715 A1 | 5/2013 | Buchhop |
| 2013/0151453 A1 | 6/2013 | Bhanot et al. |
| 2013/0212658 A1 | 8/2013 | Calvo et al. |
| 2014/0108251 A1* | 4/2014 | Anderson ........... G06Q 20/4016 |
| | | 705/44 |
| 2014/0324677 A1* | 10/2014 | Walraven ........... G06Q 20/4016 |
| | | 705/39 |

OTHER PUBLICATIONS

"Reduce Online Fraud with the minFraud Service". Retrieved from: http://www.maxmind.com/en/ccv_overview; Mar. 10, 2014.

"How banks are detecting credit fraud". Retrieved from : http://www.computerweekly.com/feature/How-banks-are detecting-credit-fraud; Jun. 2008.

\* cited by examiner

FRAUD DETECTION

BACKGROUND

In general, a customer can access and transact with one or more of the customer's financial institution accounts through any of a variety of channels. As non-limiting examples, a customer's physical credit card can be used to make purchases at a point of sale, the credit card number can be used to make purchases online, the customer's account information can be accessed and viewed through a financial institution website, and the customer can manage the account through a phone bank. However, while these options provide increased access and convenience for the customer, each of these channels also provide opportunities for fraudulent access. Additionally, some channels of access may be more prone to fraud, either through vulnerabilities of those channels, or because fraud is more common via such channels.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a system that can facilitate identification and appropriate response to fraud or potential fraud. One such system can include a monitoring component that can monitor one or more characteristics associated with an event. The event can be associated with a financial institution and an account at the financial institution. Such a system can also include a risk identification component that can analyze the one or more characteristics to determine whether to designate the event as risky and a response component that can implement one or more fraud response measures in response to the designation of the event as risky.

In another aspect, the subject innovation can include methods that can facilitate identification and response to fraud or potential fraud. One such method can include the acts of monitoring one or more events associated with at least one account at a financial institution; analyzing characteristics associated with a first event of the one or more events; determining whether to designate the first event as risky; and implementing one or more appropriate measures in response to the designation of the first event as risky.

In further aspects, the subject innovation can include methods that can facilitate identifying and responding to access points with heightened risk of fraud or potential fraud. Such a method can include the acts of monitoring an access point for one or more events associated with at least one account at a financial institution, analyzing characteristics associated with the one or more events, determining whether to designate the access point as risky, and implementing one or more measures in response to subsequent events associated with the access point.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents.

Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media.

Of course, many modifications may be made to this configuration without departing from the scope or spirit of the claimed subject matter.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In various aspects, the subject innovation can comprise systems and methods that can facilitate monitoring of banking activity (e.g., interaction with a financial institution, etc.), online or offline, for possible fraud not just at the individual customer level, but also at a broader level, for example, based on patterns and trends across a channel (e.g., channel of accessing the financial institution, etc.). For example, in various aspects, systems and methods of the subject innovation may monitor activity from channels that can include one or more of certain IP addresses, Internet service providers, individual customer or user devices, etc. (as used herein, each of these can be encompassed within the term "access point"). Such a system or method can analyze, for example, one or more of fraud rates, fraud velocity (fraud events over time), past fraud events, etc. to identify groups performing the same risky (e.g., with a probability of being fraudulent above a threshold value, etc.) events. In aspects, the subject innovation can also analyze online events (e.g., login patterns, etc.) for customers who have experienced offline fraud (e.g, debit card defunding, check fraud, etc.) to determine whether patterns of unauthorized logins have occurred on a larger scale. Collectively, these and other techniques discussed herein that can be employed in identification of events (e.g., login attempts, etc.) and access points as risky (e.g., such that all associated events can be identified as risky) can be referred to herein as "risky access profiling." At each access point (IP address, ISP, device, etc.) identified as risky, the system can monitor subsequent events (e.g., login attempts, etc.) at the risky access point and generate an appropriate response (e.g., alert customers, freeze accounts associated with login information, etc.) if login attempts are made from the risky access point.

In various aspects, the subject innovation can include methods that can facilitate detecting and responding to risky access points. One such method can include monitoring an access point (e.g., ISP, IP address, customer or user device, etc.) for activity related to a financial institution (e.g., financial transactions, logins, etc.), and determining whether an access point should be flagged as risky. Such a determining step can include one or more of (1) comparing the fraud rates, fraud velocity, and/or past fraud on the access point to risk thresholds; (2) analyzing past login attempts from the access point to detect history of fraudulent activity; (3) correlating verified offline fraud events to potential fraud activity on associated online accounts on the access point; or (4) analyzing one more customer events of patterns of behavior. Additionally, such a method can include generating an appropriate response (e.g., preventative, a response after the event, etc.) to subsequent activity on the risky access point.

Figure 1:
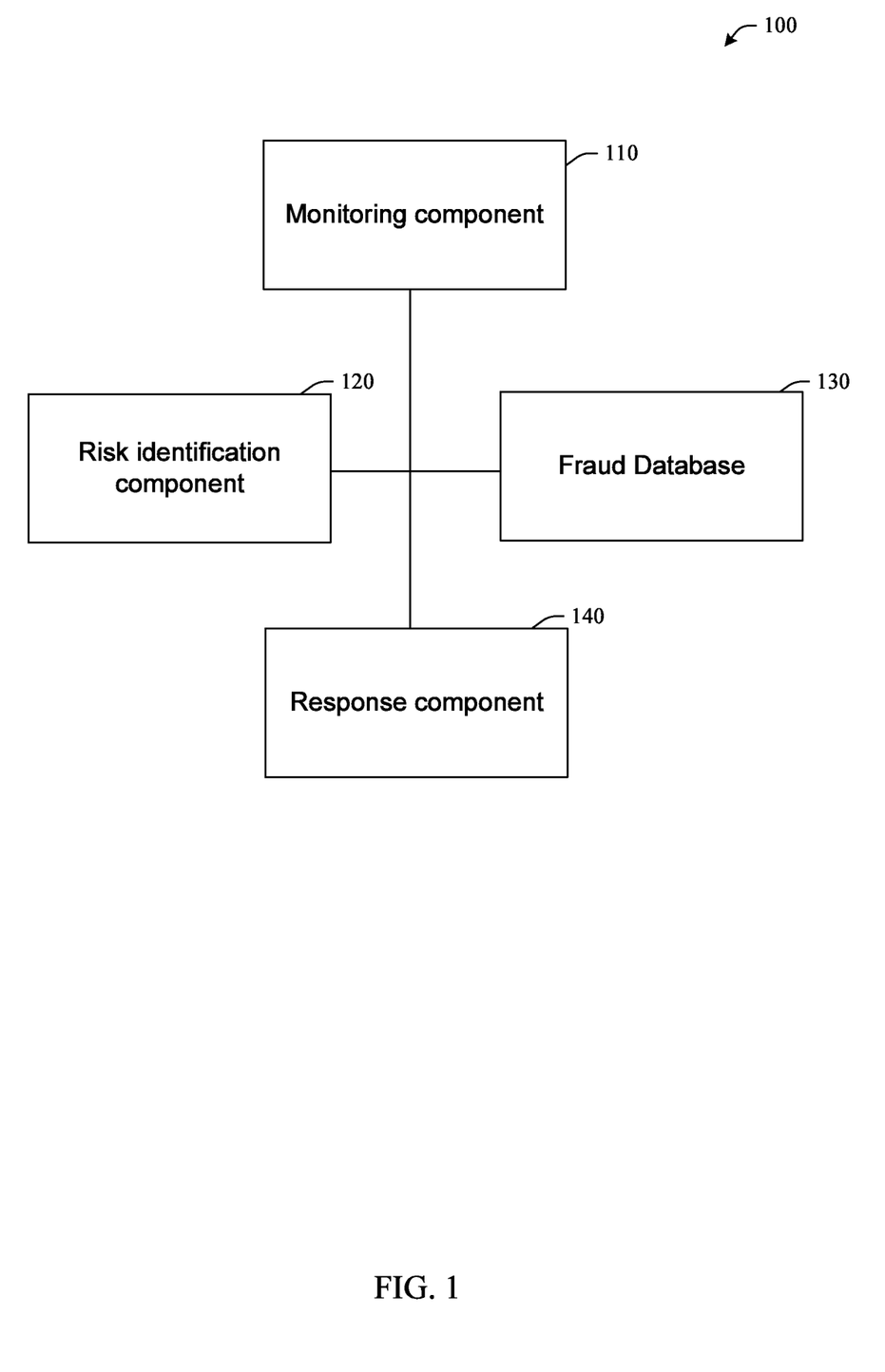
FIG. 1 illustrates a system that can facilitate identification of and response to risky (e.g., fraudulent, potentially fraudulent, etc.) events in accordance with aspects of the subject innovation.

Referring initially to the drawings, FIG. 1 illustrates a system 100 that can facilitate identification of and response to risky events in accordance with aspects of the subject innovation. System 100 can include a monitoring component 110 that can monitor characteristics associated with one or more access points (e.g., ISP, IP address, device, etc.) to a financial institution in some embodiments, or characteristics associated with one or more events associated with a customer in the same or other embodiment.

Such events can include any of (either being completed or attempted): login, transactions (e.g., fund transfers, etc.), requests for information (e.g., account queries, etc.), payment card use, changes in account information, requests for additional checks, other online or offline interactions with a financial institution in connection with a customer, etc. The monitored characteristics can include the type of event, access point (e.g., whether offline or online, and including characteristics of the access point, such as Internet protocol (IP) address, Internet service provider (ISP), device or type of device used, location, etc.), identity or purported identity of the customer, location, time, etc.

A risk identification component 120 can be included, which can, in some embodiments, analyze the monitored characteristics of the event and determine whether the event should be designated as either fraudulent or potentially fraudulent (as used herein, this is also referred to as "risky"). Risk identification component 120 can determine an event to be risky based on one or more of (1) analysis of the characteristics of the event (e.g., in comparison to static or dynamic threshold values, either regarding specific characteristics, or through determination of a risk score reflecting an analysis of the risk associated with the event, etc.), alone or in comparison with one or more other risky or fraudulent events, which can be maintained in a fraud database 130 (which can include both data regarding individual events that are risky (e.g., fraudulent, potentially fraudulent, related to prevented potential fraud, etc.), as well as additional information based on events, such as fraud rates, fraud velocity, etc. (in general, or specific rates, velocities, etc., which can be associated with common characteristics, such as for given access points, etc.); (2) determination of whether the event originates from an access point determined to be risky, which can be based on information maintained in the fraud database 130; (3) a determination of whether the event is or should be associated with a cluster of events that have been determined to be risky (e.g., based on a common fraudulent modus operandi (M.O.), which can include any of a variety of characteristics associated with a fraud or pattern of fraudulent events, such as related to time, place, access point or type of access point, type(s) of event(s), one or more characteristics of these event(s), etc.), etc.

Upon determination of an event as risky, response component 140 can implement one or more appropriate responses based on the determination, which can include one or more of alerting an owner of an account associated with the event of the event (e.g., login attempt, attempted offline payment card use, etc.), freezing the account, requiring additional information or verification through an additional channel (e.g., multi-factor authentication, or, if already used, further increasing the number of factors required, etc.), or any of a variety of other responses. In various embodiments, the nature of the response can depend on one or more of a level of risk associated with the event (e.g., based on comparisons with threshold values, etc.), the nature of the risk (e.g., potential first party fraud may require different responses than other types of fraud, etc.), etc.

In the same or other embodiments, risk identification component 120 can analyze an access point to determine if it should be designated as risky. Risky access point identification can be based on any of the characteristics discussed below in connection with FIGS. 3 and 4. Information relating to risky access points, as well as associated events and customers, can be maintained in fraud database 130. Appropriate responses can be implemented by response component, which can include implementing appropriate responses to some or all events associated with the access point.

Figure 2:
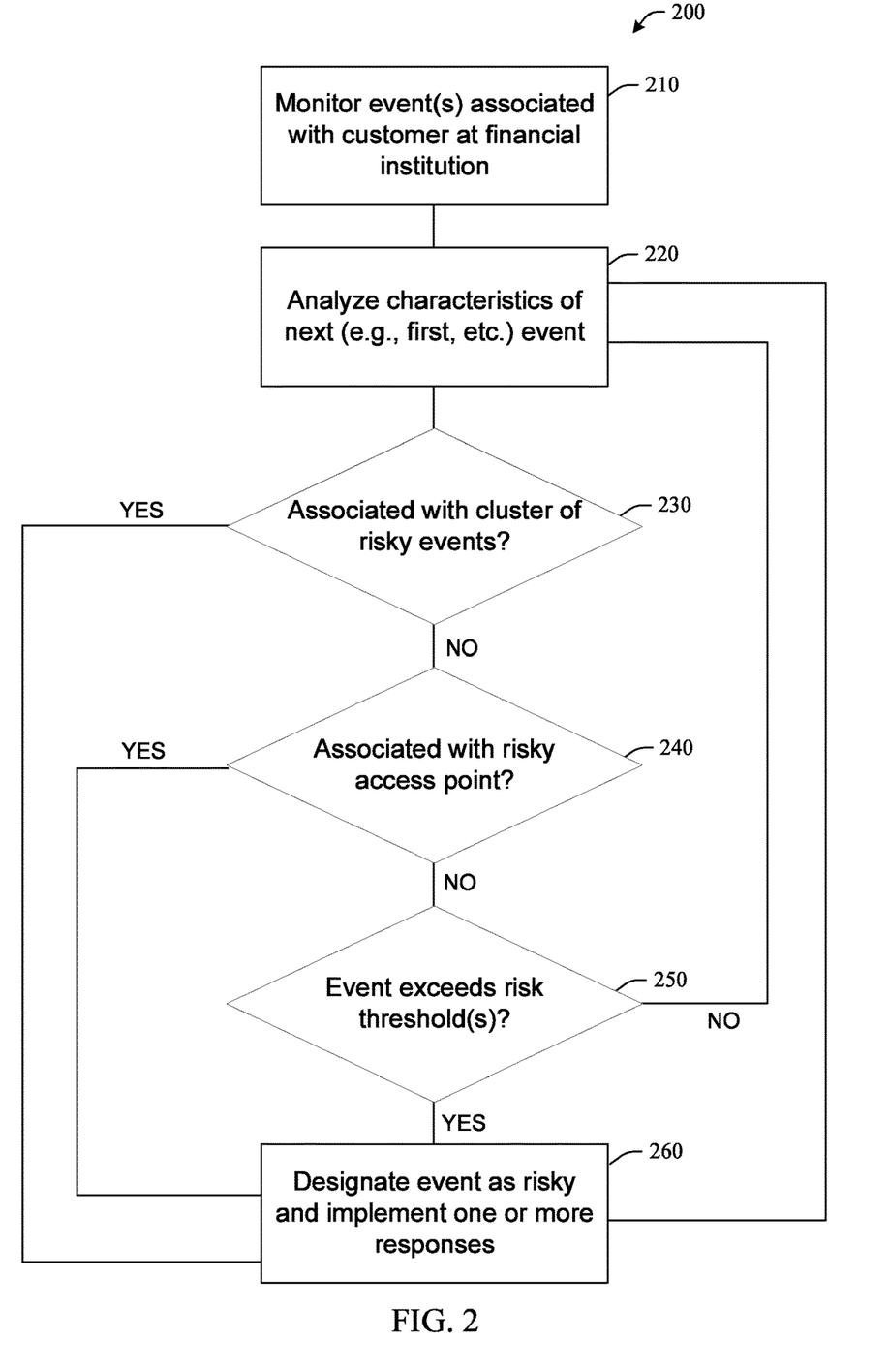
FIG. 2 illustrates a method that can facilitate fraud prevention in accordance with aspects of the subject innovation.

FIG. 2 illustrates a method 200 that can facilitate fraud prevention in accordance with aspects of the subject innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that are shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Method 200 can include an act 210 of monitoring one or more events associated with a customer at a financial institution. Additionally, there can be the act 220 of analyzing one or more characteristics associated with a first event of the one or more monitored events. Based on the analyzed characteristics, a determination can be made as to whether the event should be designated risky and a response implemented, as in acts 230-260. This can include determining, at 230, whether the first event is associated with a cluster of risky events (e.g., one or more previously determined clusters associated with specific characteristics of risky events, such as a specific M.O., etc.). If so, then at 260, the first event can be designated as risky, and one or more appropriate responses (e.g., fraud prevention, responses after the fact, etc.) can be implemented. If not, then a determination can be made at 240 as to whether the event is associated with an access point (e.g., IP address, ISP, etc.) that has been determined to be risky. As with the determination at 230, a positive determination can be followed with designation of the first event as risky, and implementation of a response at 260. If not, a determination can be made at 250 as to whether the event should be determined to be risky for any other reason, which can include comparison of the characteristics of the event to one or more risk thresholds. If the event is determined to be risky, it can be designated as such and a response can be implemented at 260. If not, or once an appropriate response has been implemented, method 200 can return to 220 to analyze characteristics of the next (e.g., second, etc.) event associated with the customer.

Figure 3:
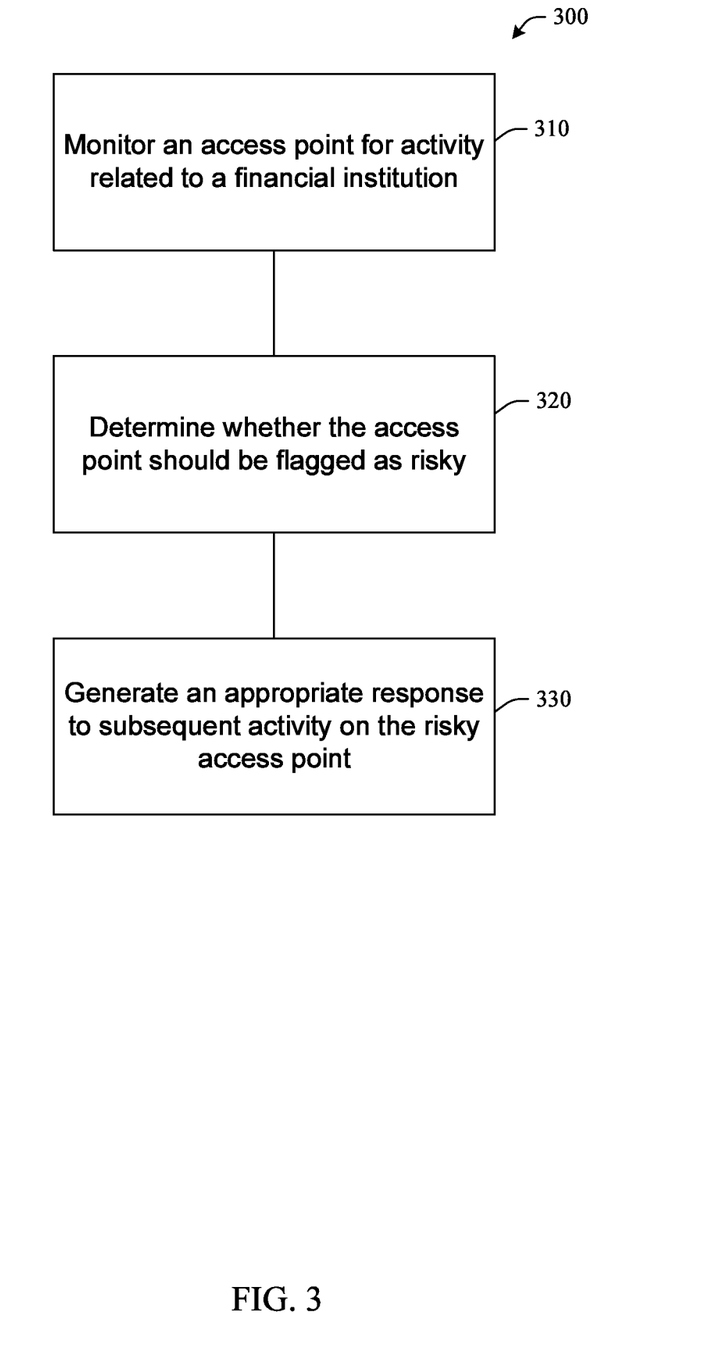
FIG. 3 illustrates a method that can facilitate identification of and response to risky access points in accordance with aspects of the subject innovation.

FIG. 3 illustrates a method 300 that can facilitate identification of and response to risky access points in accordance with aspects of the subject innovation. At 310, the method can monitor an access point (ISP, IP address, user device, etc.) for activity related to a financial institution (e.g., financial transactions, logins, etc.). At 320, a determination can be made as to whether the access point should be designated as risky based on any of a variety of factors discussed herein, and at 330, after determination that the access point is risky, appropriate responses can be implemented in response to any further activity associated with the risky access point.

Figure 4:
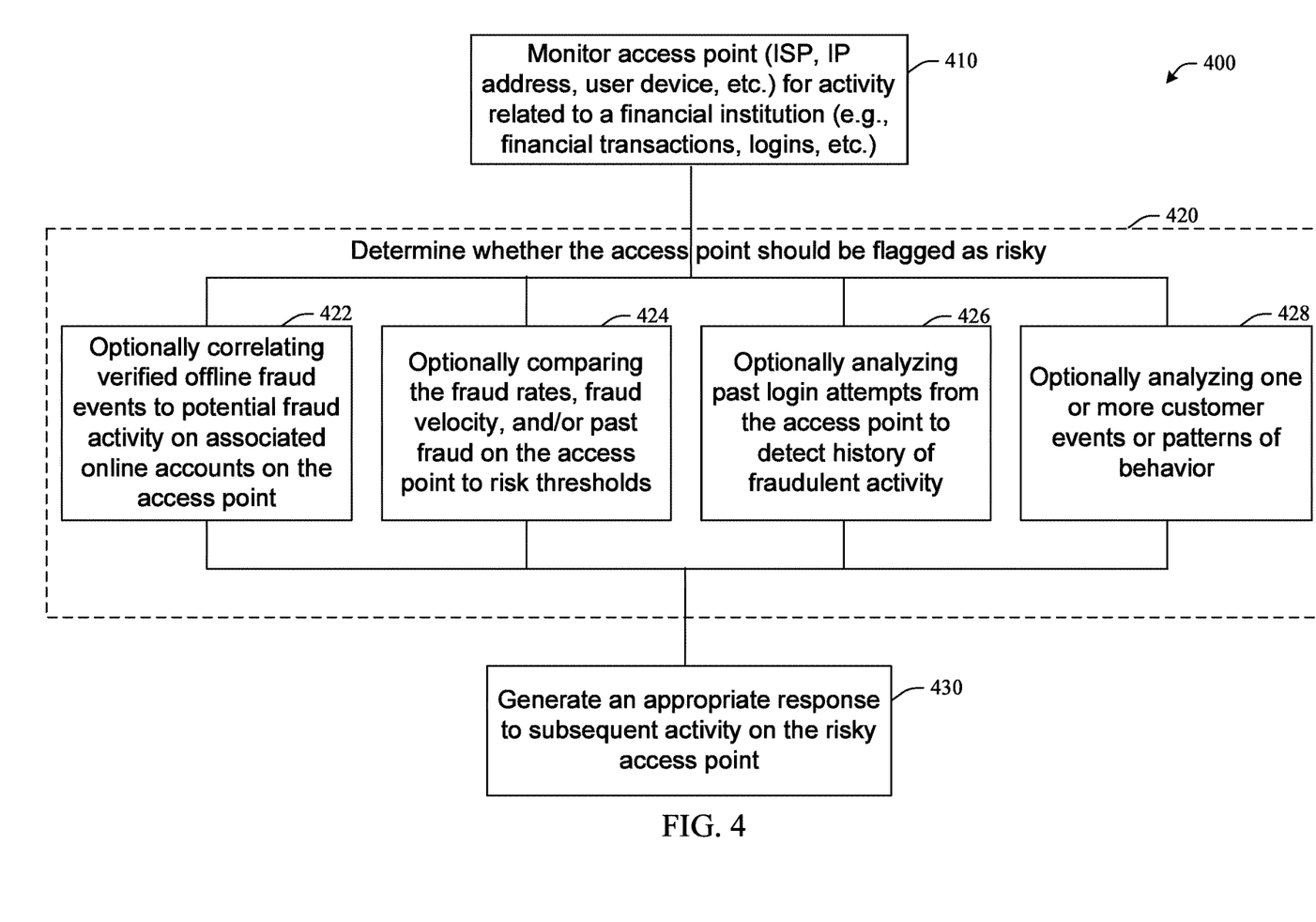
FIG. 4 illustrates an example implementation of a method that can facilitate identification of and response to risky access points in accordance with aspects of the subject innovation.

FIG. 4 illustrates an example implementation of a method 400 that can facilitate identification of and response to risky access points in accordance with aspects of the subject innovation. Acts 410 through 430 can be as described in connection with similar acts 310 through 330 described in connection with FIG. 3. Act 420 shows example specific types of analysis 422-428 that can be considered in determining whether the access point should be designated as risky, including at 422, optionally correlating verified offline fraud events to potential fraud activity on associated online accounts on the access point; at 424, optionally comparing one or more of the fraud rates, fraud velocity, or past fraud events on the access point to risk thresholds; at 426, optionally analyzing past login attempts from the access point to detect a history of fraudulent activity; or at 428, optionally analyzing one or more customer events or patterns of behavior. Risky access points and potential fraud can be identified based on patterns of events, even when individual events are not risky. For example, an individual customer changes their mailing address via an access point has a relatively low probability of potential fraud, but if ten customers addresses are changed via the access point, there is a higher probability of potential fraud, which may be elevated even further based on various characteristics (e.g., each event occurred from the same device, location, at similar times, etc.). In various embodiments, the subject innovation could designate the access point as risky in the latter situation, but not in the former.

The methods of FIGS. 3 and 4 can be employed in both a prospective, ongoing manner, and a retrospective manner. For example, monitoring of an access point can occur in an ongoing manner either before or after identification of the access point as risky. Additionally, upon identification of an access point as risky, the method of FIG. 3 or FIG. 4 can be employed in a retrospective manner, such as by reviewing past events associated with the access point to determine if any additional fraudulent or potentially fraudulent events have occurred, to identify customers associated with the risky access point, as well as to identify and review events and access points associated with those customers to determine potential risk, even if they did not occur via the risky access point.

In various aspects, the subject innovation can employ any of a variety of techniques for identifying risky access points, and provides multiple strategies for dealing with access points identified as risky. In aspects, factors such as fraud rates and fraud velocity (numbers seen over time) can be used to determine whether to identify an access point as risky (and implement appropriate responses such as those described herein, e.g., alerting, etc.), instead of relying solely on single fraud events at a particular ISP, IP address, device, etc. Risk determination can also be based on analysis of current or historical customer actions, for example, by systemically identifying groups of customers (e.g., networks, etc.) performing the same or similar risky events. Thresholds (e.g., static, dynamic, etc.) can be employed such that identification of access points as risky or not can be based on threshold values of one or more factors discussed herein (e.g., fraud rate, fraud velocity, etc.).

Aspects of the subject innovation can perform retro alert processing in connection with risky access point identification and response. For example, the subject innovation can perform identification and response based at least in part on historical information associated with access points, for example, past logins from an ISP, IP address, device, PCPrint, etc. In some embodiments, historical log in patterns can be systemically analyzed to reduce false positives (e.g., in terms of identification of an access point as risky, etc.), such as by removing third party logins, ownership change in IP address, etc.

In various aspects of the subject innovation, identification and analysis of risky or potentially risky access points can be actively or dynamically managed based on one or more factors (e.g., fraud rate, fraud velocity, etc.). Analysis of factors such as fraud rate, fraud velocity, etc. can be employed for use in actively managing fraud link analysis (e.g., based on fraud rates, fraud velocity, etc.). Event categorization (e.g., as fraudulent or not, etc.) and response (e.g., whether to initiate a response, and if so, of what type, etc.) can be based on dynamic thresholding in various aspects. Risk thresholds of the subject innovation can employ thresholds that can vary based on any of a variety of characteristics, and can in some embodiments vary dynamically. For example, differing thresholds can be used with different access points or types of access points, which can be based on characteristics of the access point or type of access point, including security capabilities, past or current events associated with the access point or type of access point, etc. In another example, thresholds can vary based on times or locations associated with events in connection with a customer, such as in comparison to times or locations associated with past events in connection with the customer. Thresholds can also vary over time, for example, based on timestamps associated with past risky events, seasonal variations, etc. As another example, thresholds can vary based on characteristics associated with events, such as a type of actual or potential fraud, a probability associated with potential fraud, etc. Additionally, in various aspects, systemic event categorization and response can be based on characteristics of associated fraudulent or potentially fraudulent activity, such as the M.O. of the fraud, known or suspected targets of the fraud, known or suspected access points through which the fraud has or could operate, etc.

In one or more embodiments of the subject innovation, techniques can be employed for identifying and responding to potentially risky access points based on multiple channels. Risky access profiling techniques employable herein (e.g., to detect risky logins, identify access points as risky, etc.) can be based at least in part on historical patterns associated with online fraud events. Additionally, such techniques can include analysis of login patterns for online banking customers who have experienced offline fraud.

In various embodiments, aspects of the subject innovation can be employed to detect fraudulent access even in situations not involving financial transactions, for example, detection of online surveillance, the unauthorized access fraud that occurs when a user's online banking account is compromised but no unauthorized online transactions have occurred. Examples of such situations include a scenario wherein a fraudster logs in and views the balance of a demand deposit account (DDA) to determine funds available for debit card defunding, or when a fraudster logs in and orders checks to an alternate address, resulting in defunding via check fraud. However, systems and methods of the subject innovation, by employing risky access profiling techniques discussed herein, can identifying these and similar accesses as potentially fraudulent, and respond in any of a variety of manners (e.g., alert customers, require additional information or verification through a separate channel for accessing the account, freeze accounts associated with login information, etc.).

In further aspects, the subject innovation can employ risky access profiling techniques that determine clusters of events or access points based on any of a variety of characteristics. These clusters can be used as additional or alternative criteria for identification of access as potentially risky. In aspects, clusters can be created based on one or more of associations between various events based on common attributes (e.g., device types, locations, etc) that can be tracked and grouped over time; based on evaluations of M.O. of fraudulent or potentially fraudulent events (e.g., access attempts, etc.), which can in some embodiments be validated such that the M.O. remains consistent across a cluster. Based on the defining characteristics (e.g., M.O., etc.), new events can be added or not added to the cluster based on a comparison between the characteristics of the event and the characteristics associated with the cluster. By identifying access attempts or access points via clusters and associating them with fraudulent or potentially fraudulent events, systems and methods of the subject innovation can provide pre-event predictions of loss due to fraud, and can prevent, mitigate, etc. such losses from occurring by triggering responses (e.g., such as those discussed herein, etc.) for events or access points associated with the cluster.

Aspects of the subject innovation employing techniques that determine clusters can also facilitate identification of first party fraud (wherein the customer or user is the perpetrator of the fraud). Since the M.O. of fraud associated with a determined cluster can remain consistent across the cluster when there is evidence of (historical) first party fraud, all remaining fraud that is associated with that determined cluster also has a high probability of being first party fraud. Once a first party fraud cluster is determined, all associated events (e.g., login attempts, etc.) can be evaluated based on association with the cluster, regardless of whether these events would otherwise meet any associated thresholds. By associating these events based on the determination of association with the cluster, the issue of device drift can be resolved, and events (e.g., login attempts, etc.) can be identified based on association with the cluster, regardless of the device used during the attempted access.

In various aspects, embodiments of the subject innovation can link events to clusters or otherwise identify events as risky (or dynamically adjust thresholds, etc.), based on unconfirmed events (e.g., that have not been confirmed as fraudulent yet, etc., but have been identifies as risky or potentially fraudulent, such as based on cluster association, association with a risky access point, event-specific criteria, etc.). These linked events can be designated as risky and a response can be initiated. In various aspects, factors that can be employed for analyzing potential risk of fraud of associated events (e.g., fraud rate, etc.), etc., can include events wherein a response was implemented even when no actual or suspected fraud occurred, due to the likelihood of fraud having been prevented.

In various embodiments, the nature of the response can depend on the level of association to other risky events, access points, clusters, etc., such that some responses (e.g., alerting customer and freezing account, etc.) can be implemented for events wherein there is a higher likelihood of fraud or closer association to other fraudulent events, etc., while other responses can be implemented in situations with a lower (but still elevated) risk of fraud (e.g., alert customer, require additional verification for access, etc., or combinations thereof). Additionally, the response can depend on the nature of the potential fraud. As a non-limiting example, in suspected first party fraud, alerting the customer only may be less likely to prevent fraud than responses that include freezing the account.

Although discussed primarily in connection with online transactions, systems and methods of the subject innovation can provide for pre-transaction identification or response to potential fraud in other channels, as well. As one non-limiting example, the subject innovation can be employed in connection with offline payment card transactions or offline check transactions, wherein an embodiment of the subject innovation can be implemented in connection with a request for authorization, and can determine whether a response should be implemented in the event of potential fraud.

Figure 5:
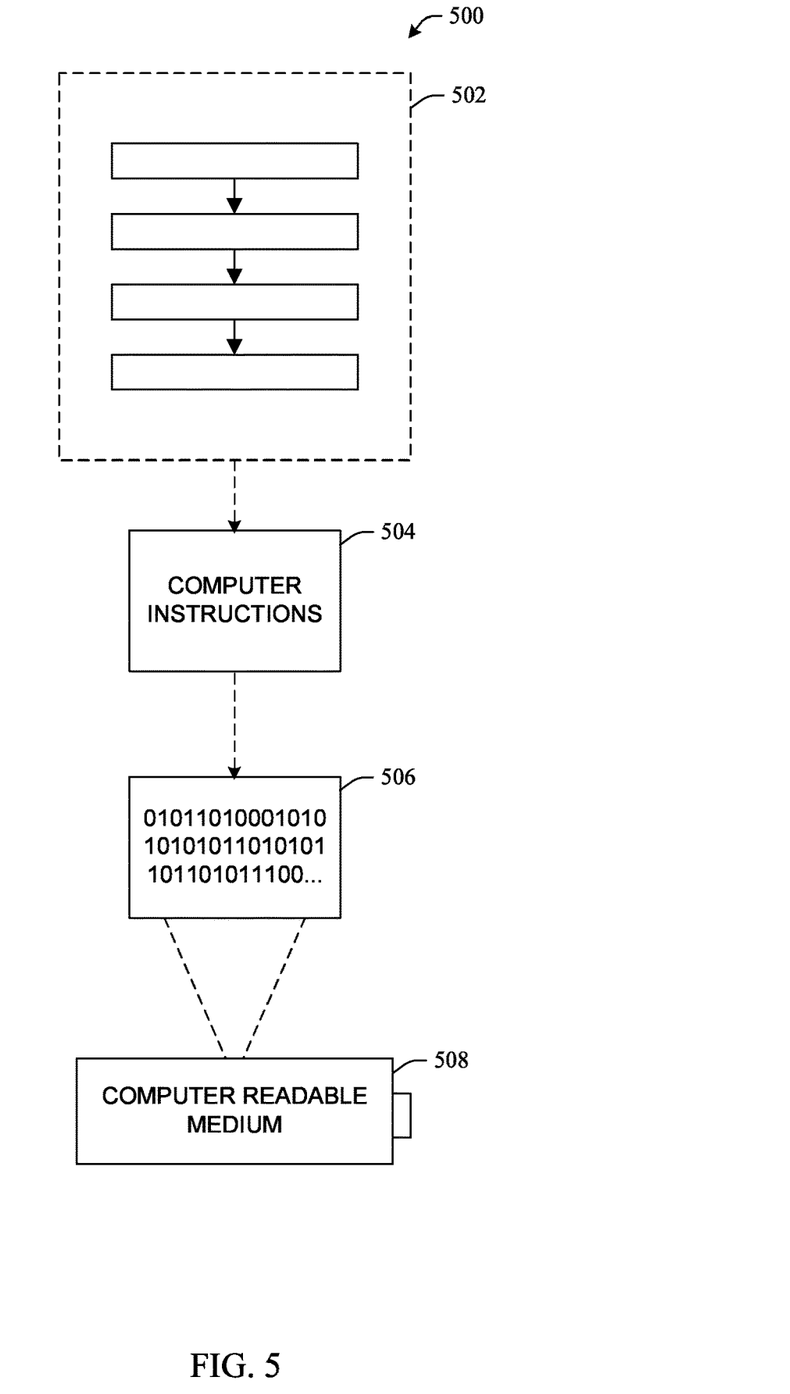
FIG. 5 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 5, wherein an implementation 500 comprises a computer-readable medium 508, such as a CD-R, DVD-R, flash drive, a platter of a hard disk drive, etc., on which is encoded computer-readable data 506. This computer-readable data 506, such as binary data comprising a plurality of zero's and one's as shown in 506, in turn comprises a set of computer instructions 504 configured to operate according to one or more of the principles set forth herein. In one such embodiment 500, the processor-executable computer instructions 504 is configured to perform a method 502, such as at least a portion of one or more of the methods described in connection with embodiments disclosed herein. In another embodiment, the processor-executable instructions 504 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 6:
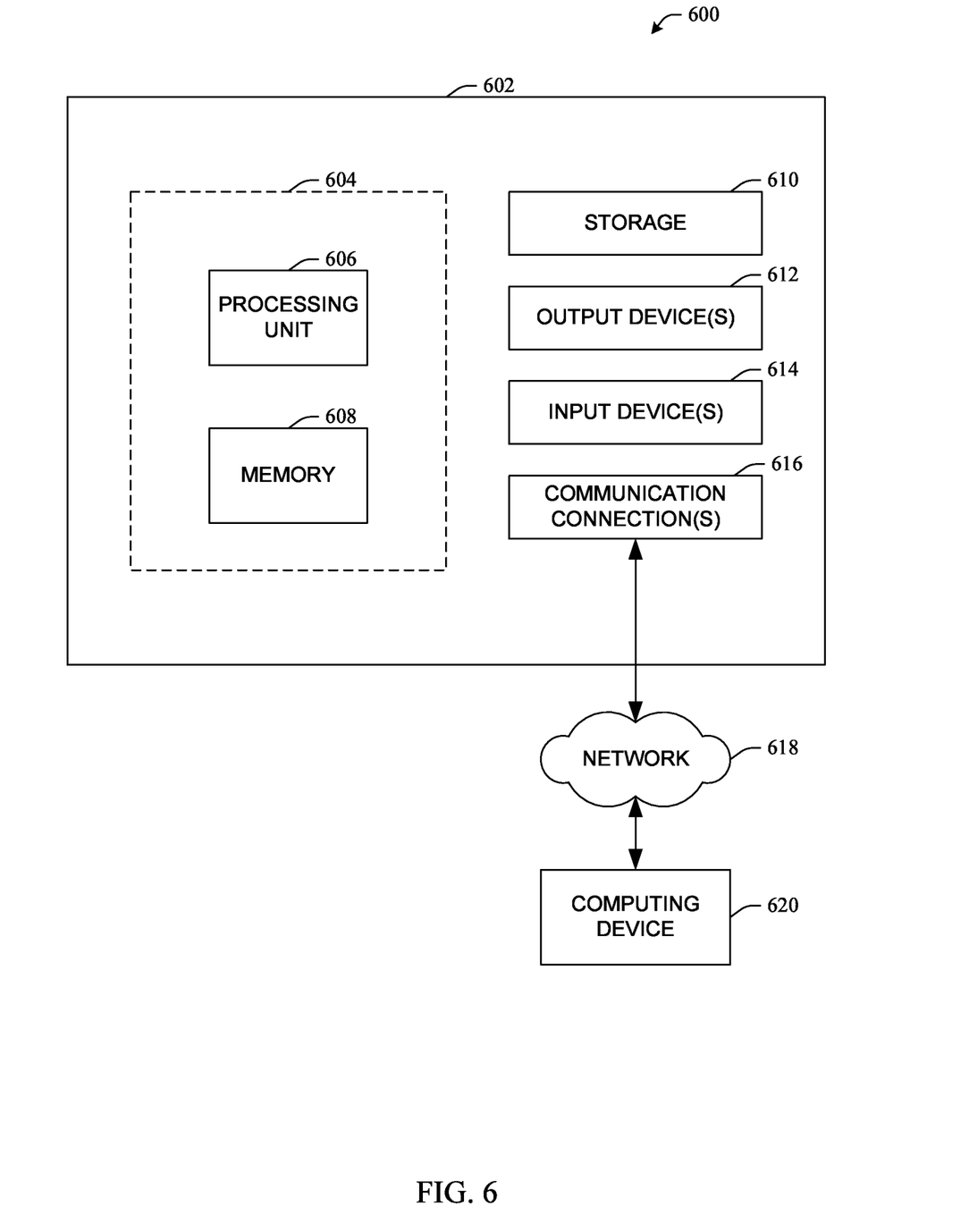
FIG. 6 illustrates a computing environment where one or more of the provisions set forth herein can be implemented, according to some embodiments.

FIG. 6 and the following discussion provide a description of a suitable computing environment in which embodiments of one or more of the provisions set forth herein can be implemented. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 6 illustrates a system 600 comprising a computing device 602 configured to implement one or more embodiments provided herein. In one configuration, computing device 602 can include at least one processing unit 606 and memory 608. Depending on the exact configuration and type of computing device, memory 608 may be volatile, such as RAM, non-volatile, such as ROM, flash memory, etc., or some combination of the two. This configuration is illustrated in FIG. 6 by dashed line 604.

In these or other embodiments, device 602 can include additional features or functionality. For example, device 602 can also include additional storage such as removable storage or non-removable storage, including, but not limited to, magnetic storage, optical storage, and the like. Such additional storage is illustrated in FIG. 6 by storage 610. In some embodiments, computer readable instructions to implement one or more embodiments provided herein are in storage 610. Storage 610 can also store other computer readable instructions to implement an operating system, an application program, and the like. Computer readable instructions can be loaded in memory 608 for execution by processing unit 606, for example.

The term "computer readable media" as used herein includes computer storage media. Computer storage media includes volatile and nonvolatile, removable and non-removable media implemented in any method or technology for storage of information such as computer readable instructions or other data. Memory 608 and storage 610 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 602. Any such computer storage media can be part of device 602.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 602 can include one or more input devices 614 such as keyboard, mouse, pen, voice input device, touch input device, infrared cameras, video input devices, or any other input device. One or more output devices 612 such as one or more displays, speakers, printers, or any other output device can also be included in device 602. The one or more input devices 614 and/or one or more output devices 612 can be connected to device 602 via a wired connection, wireless connection, or any combination thereof. In some embodiments, one or more input devices or output devices from another computing device can be used as input device(s) 614 or output device(s) 612 for computing device 602. Device 602 can also include one or more communication connections 616 that can facilitate communications with one or more other devices 620 by means of a communications network 618, which can be wired, wireless, or any combination thereof, and can include ad hoc networks, intranets, the Internet, or substantially any other communications network that can allow device 602 to communicate with at least one other computing device 620.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor and computer instructions stored as executable components in a non-volatile memory comprising:
a monitoring component that monitors an access point for a set of characteristics associated with the access point, including a designated internet protocol address, an internet service provider, and device information;
a risk identification component that analyzes information for an event associated with the access point and compares the information for the event to at least one risk threshold value,
wherein the event is associated with a financial institution and an account at the financial institution,
wherein the risk identification component designates the event associated with the access point as risky based on a determination that event information exceeds one or more risk threshold values and the event is associated with a cluster of first party fraud events; and,
a response component that implements fraud response measures selected from a variety of fraud response measures, wherein the fraud response measures implemented for first party fraud differ from the fraud response measures implemented for third party fraud, the first party fraud response measures comprising:
designating the access point as risky,
deeming subsequent events performed on the access point have a high probability of also being first party fraud regardless of whether information for the subsequent events would meet the one or more risk threshold values, and,
requiring the subsequent events performed on the access point and associated with the account to include verification through an access channel different from an access channel utilized for the event.

2. The system of claim 1, wherein the at least one risk threshold value is a dynamic threshold.

3. The system of claim 1, wherein the risk identification component further designates the event as risky based on a match between the information for the event and information retained in a fraud database, wherein the information for the event includes a pattern between the event and other events associated with the access point, wherein the fraud database stores information associated with one or more additional events previously designated as risky, and wherein the risk identification component designates the event as risky based on a comparison between the information for the event and the information associated with the one or more additional events.

4. The system of claim 1 wherein the cluster of first party fraud events is associated with a common modus operandi.

5. The system of claim 1, wherein the fraud response measures further comprise at least one of alerting an owner of the account, freezing the account, or requiring additional information or acts to access the account.

6. The system of claim 1, wherein the risk identification component determines one or more of a likelihood of potential fraud or a type of potential fraud associated with the access point, and the response component implements the fraud response measures based at least in part on one or more of the likelihood of potential fraud or the type of potential fraud.

7. The system of claim 2, wherein the at least one risk threshold value varies over time based on timestamps associated with past risky events.

8. The system of claim 3, wherein the stored information comprises one or more of a fraud rate or a fraud velocity associated with the one or more additional events.

9. The system of claim 3, wherein the one or more additional events comprise at least one offline event.

10. The system of claim 3, wherein the one or more additional events comprises at least one event associated with one or more of prevented fraud or unconfirmed fraud.

11. A method, comprising:
monitoring, by a system comprising a processor and computer instructions stored as executable components in a non-volatile memory, an access point for a set of characteristics associated with the access point, including a designated internet protocol address, an internet service provider, and device information;
analyzing, by the system, information for an event associated with the access point and comparing the information for the event to at least one risk threshold value,
wherein the event is associated with a financial institution and an account at the financial institution,
wherein the risk identification component designates the event associated with the access point as risky based on a determination that event information exceeds one or more risk threshold values and the event is associated with a cluster of first party fraud events; and,
implementing, by the system, fraud response measures selected from a variety of fraud response measures, wherein the fraud response measures implemented for first party fraud differ from the fraud response measures implemented for third party fraud, the first party fraud response measures comprising:
designating the access point as risky,
deeming subsequent events performed on the access point have a high probability of also being first party fraud regardless of whether information for the subsequent events would meet the one or more risk threshold values, and,
requiring the subsequent events performed on the access point and associated with the account to include verification through an access channel different from an access channel utilized for the event.

12. The method of claim 11, wherein the at least one risk threshold value is a dynamic threshold.

13. The method of claim 11, wherein the risk identification component further designates the event as risky based on a match between the information for the event and information retained in a fraud database, wherein the information for the event includes a pattern between the event and other events associated with the access point, wherein the fraud database stores information associated with one or more additional events previously designated as risky, and wherein the risk identification component designates the event as risky based on a comparison between the information for the event and the information associated with the one or more additional events.

14. The method of claim 11, wherein the cluster of first party fraud events is associated with a common modus operandi.

15. The method of claim 11, wherein the fraud response measures further comprise at least one of alerting an owner of the account, freezing the account, or requiring additional information or acts to access the account.

16. The method of claim 11, wherein the risk identification component determines one or more of a likelihood of potential fraud or a type of potential fraud associated with the access point, and the response component implements the fraud response measures based at least in part on one or more of the likelihood of potential fraud or the type of potential fraud.

17. The method of claim 12, wherein the at least one risk threshold value varies over time based on timestamps associated with past risky events.

18. The method of claim 13, wherein the stored information comprises one or more of a fraud rate or a fraud velocity associated with the one or more additional events.

19. The method of claim 13, wherein the one or more additional events comprise at least one offline event.

20. The method of claim 13, wherein the one or more additional events comprises at least one event associated with one or more of prevented fraud or unconfirmed fraud.

\* \* \* \* \*